J. SMITH.
Cotton Seed Huller.
No. 3,951. Patented March 15, 1845.
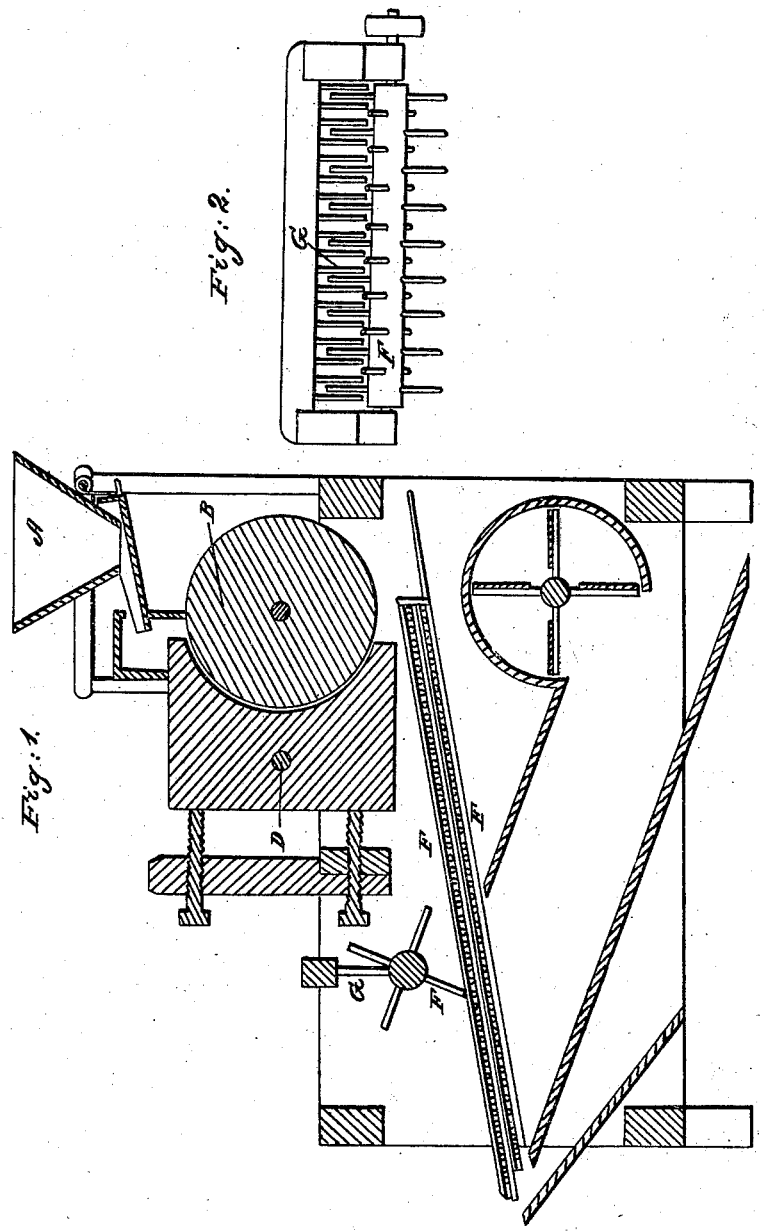

UNITED STATES PATENT OFFICE.

JABEZ SMITH, OF PETERSBURG, VIRGINIA.

IMPROVEMENT IN MACHINES FOR HULLING COTTON-SEED.

Specification forming part of Letters Patent No. 3,951, dated March 15, 1845.

*To all whom it may concern:*

Be it known that I, JABEZ SMITH, of the town of Petersburg, in the county of Dinwiddie and State of Virginia, have made a new and useful Improvement in the Manner of Constructing a Machine for Hulling or Husking Cotton-Seed, said improvement being made on a machine for which Letters Patent were originally obtained by Francis Follet, of the town of Petersburg, which Letters Patent were dated on the 21st day of January, in the year 1829, and upon which machine the said Follet subsequently made an improvement, for which also he obtained Letters Patent dated on the 15th day of December, in the same year, and upon which I, JABEZ SMITH, made an improvement, for which, likewise, I obtained Letters Patent dated on the 28th day of December, 1829, said several Letters Patent being now on record in the Patent Office; and I do hereby declare that the following is a full and exact description of the improvement on said machine for which I now ask Letters Patent of the United States.

Although said machine has been successfully and extensively carried into operation, there has always been a wastage of from ten to fifteen per cent., from the adherence together of a considerable portion of the hulled seed, in consequence of the fibers of cotton-wool, always left thereon in the process of ginning. This formed matted lumps and prevented a large quantity of the pieces of kernel from passing through the riddles after they had been crushed by the cylinder and concave. By the addition to the said machine of what I denominate a "double beater and rack," to operate upon the matted hulls, seed, and fibers after they leave the cylinder and concave, I completely separate these from each other, so that the portion of seed heretofore lost is made to pass through the riddles or screens. In the original machine the cylinder and concave were both made of granite, at much labor and cost; but I now make these parts of wood, usually by attaching plank to suitably-formed heads of cast-iron. The cylinder thus formed is to be turned true, and the concave duly worked out so as to be adapted thereto. I then take burr-millstone grit and reduce it to coarse powder—say about the size of mustard-seed—and with this I cover the cylinder and the face of the concave, making the powder adhere thereto by the aid of a suitable varnish, or by means of marine glue, or other cement which is not acted upon by oil or by moisture, distributing the said grit equally, and passing a roller over it, or otherwise forcing it to embed itself in the cement and to form an even surface. This part of the apparatus so formed I have found to operate better than the granite, while it is lighter, much cheaper, and easily renewed.

In the accompanying drawings, Figure 1 is a vertical section through the middle of the machine from front to back, the hopper A, the cylinder B, the concave D, the riddles E E, and the general arrangement of the other parts of the machine being substantially the same with that described in F. Follet's patent, above named, and to which reference may be had. F is a sectional view of my double beater, and G of the rack between which its teeth pass as they revolve, which they do with a speed of two or three hundred revolutions in a minute. Fig. 2 is a back view of said beater and rack. This beater intercepts all the clotted lumps as they pass along the upper riddle, beating them back with a force which completely separates them; and should any adhere to the beaters they are removed therefrom by the rack. The shaft of the beaters is carried by a pulley and band in the ordinary way, and by the same motive power that carries the cylinder.

Having thus fully described the nature of my improvement in the machine for hulling cotton-seed, I do hereby declare that I do not claim the double beater or the rack as being new in themselves; but

What I do claim as new, and desire to secure by Letters Patent, is—

The combining of such a beater and rack with the cylinder, concave, and riddle, constituting the main operating parts of the above-named machine for hulling cotton-seed, by which combination said machine is essentially improved and economy greatly promoted.

JABEZ SMITH.

Witnesses:
　THOS. P. JONES,
　EDWIN L. BRUNDAGE.